United States Patent [19]

Vischer et al.

[11] Patent Number: 4,545,403

[45] Date of Patent: Oct. 8, 1985

[54] FLOW REGULATING DEVICE

[75] Inventors: Daniel Vischer; Peter Volkart, both of Zürich, Switzerland

[73] Assignees: Hansjorg Brombach; Heinrich Hohlwegler, both of Fed. Rep. of Germany

[21] Appl. No.: 477,885

[22] Filed: Mar. 23, 1983

[30] Foreign Application Priority Data

Mar. 24, 1982 [DE] Fed. Rep. of Germany ....... 3210718

[51] Int. Cl.[4] .............................................. G05D 7/00
[52] U.S. Cl. .................................... 137/497; 137/395; 137/500; 251/5
[58] Field of Search .................... 251/5; 137/395, 497, 137/500

[56] References Cited

U.S. PATENT DOCUMENTS 3,360,002 12/1967 Weis ..................................... 137/395
4,071,039 1/1978 Goof ..................................... 251/5 X

FOREIGN PATENT DOCUMENTS 1252650 12/1960 France ................................... 251/5
565538 11/1944 United Kingdom .
583535 12/1946 United Kingdom .
741031 11/1955 United Kingdom .
1421890 1/1976 United Kingdom .
1601438 10/1981 United Kingdom .
226876 9/1968 U.S.S.R. ............................. 137/497

Primary Examiner—Robert G. Nilson
Attorney, Agent, or Firm—Steele, Gould & Fried

[57] ABSTRACT

A device for regulating the flow or outflow of liquids comprises an outer encasing tube, having a feed tube connected to an inlet and in which is a cylindrical hose coupling is disposed, which is tightly connected to an outlet. The liquid acts indirectly from the outside on the hose coupling via a gas cushion, so that a pressure difference occurs within the hose coupling, which leads to a bulging, and consequently, a cross-sectional reduction of hose coupling. The complete arrangement is arranged on the dry side of a container wall.

22 Claims, 9 Drawing Figures

FLOW REGULATING DEVICE

BACKGROUND OF THE INVENTION

The invention relates to a device for regulating the flow of a liquid, particularly for the control of the outflow of sewers and for controlling the flow in pipelines, with a flexible hose coupling indirectly subjected to the action of the liquid from the outside and connected to an outlet of the device.

It is known from the German journal Wasserwirtschaft, no. 12, 1979, to regulate the outflow from a tank or basin with the aid of a hose restrictor, i.e. the outflow quantity from the tank is made independent of the water level therein. This hose restrictor contains a piece of flexible hose, which is arranged with its outflow end on the discharge pipe, while its feed end is held open by a short inflexible connection. The hose coupling is itself completely contained within the tank, so that the hydraulic pressure can act thereon. It has already been proposed as a test arrangement to disposed the hose restrictor outside the tank, a second or additional line being used for transferring the hydraulic pressure from the tank. However, this test arrangement is not suitable for practical operation, because a second discharge line must also be provided on existing storage basins. This test arrangement is also unusable in regulating waste water, because the additional control line would rapidly become obstructed and clogged with sewage.

In addition, DOS No. 28 22 299 discloses a regulator for a flow medium, in which a flexible hose is enclosed in a regulating chamber terminated by a diaphragm. However, in this known regulator two diaphragms are fundamentally required.

SUMMARY OF THE INVENTION

The object of the present invention is to provide a flow regulator, which is simply constructed and easy to install, maintain and inspect and which reliably operates under all operating conditions, particularly in the case of low outflow quantities and polluted water.

According to the invention this object is achieved by a device having a hose restricter, wherein the hose coupling is arranged in an encasing tube provided with an inlet and an outlet. The end of the hose coupling is tightly connected to the inlet. The gap between the hose coupling and the encasing tube is connected via a gastight line with the upper end of a branch of the feed pipe, the branch pointing in the opposite direction to the flow direction.

These measures proposed in the invention make it possible to construct the complete device as a single component, which can be installed on the dry side of the discharge lines in a shaft structure. The gas, normally, air, present in the gap between the hose coupling and the encasing tube, is compressed by the liquid rising in the branch and consequently exerts a pressure on the outside of the hose coupling, so that the latter can be pressed inwardly and constricted.

According to a further development of the invention, it is proposed that the effective cross-section of the branch is greater than the cross-section of the feed pipe. This leads to a relatively large volume change of the gas used for constricting the hose in the response to only a relatively small change in the height of rise of the liquid in the branch. This can be achieved in the case of a horizontally directed feed line, by a branch which forms an acute angle (different from zero) with the longitudinal axis of the feed line, at least when viewed from the side. It is particularly advantageous if, when viewed from above, the branch also forms an angle differing from zero.

The invention also proposes a device of the aforementioned type in which the hose coupling is arranged in an encasing tube with an inlet and an outlet, a space being left between the end of the inlet in the encasing tube and the opening of the hose coupling, which is preferably covered by a filter.

In this case, the pressure acting from the outside on the hose coupling is applied by the actual liquid. This once again leads to a device which is completely closed and need only be connected, for example, to one outlet port of a sewage tank. The gap between the end of the inlet and the front opening of the hose coupling is normally a piece of cylinder jacket, so that it is easily possible to insert a filter at this point. This has the important advantage that only filtered water acts on the outside of the hose coupling, thereby avoiding any risk of contamination or pollution. The liquid flow sweeps over the filter, so that filter pollutants are washed away by the flow. Moreover, on reducing the outward bulge of the hose, the water is again forced back through the filter, so that pollutants are also eliminated in this way.

The invention also proposes that over at least part of its periphery, the hose coupling is secured in unbendable manner over its entire length. Since, in operation, the hose coupling can be subject to different bulge shapes with varying numbers and positions of said bulges, this measure ensures that, for example, the edge between two adjacent bulges is located at a specific point. In this case, for example, a rod would be arranged in the hose restrictor on the periphery thereof. It is naturally also possible, for example, to use two facing rods. It is also possible to stabilize the bulge shapes through incorporating into the hose coupling at least one flexible, longitudinally directed band, which is preferably relatively inextensible. It is also possible to use a cylinder jacket portion extending over a larger angle in order to prevent a bulging out of the hose coupling, for example in the lower area.

The invention also proposes that the inlet and outlet within the encasing tube are interconnected by a restricting tube, which has at least one filter opening and/or at least one diaphragm opening. This is a particularly favorable embodiment The device then substantially comprises two telescoped tubes and according to a further feature of the invention, the hose coupling and/or a filter hose are mountable on to the inner restricting tube.

The diaphragm opening of the restricting tube, in whose vicinity the hose coupling can deform inwards, can, according to the invention, be made wider in the flow direction.

A shape preferred by the invention provides for the diaphragm opening to extend over approximately half the periphery of the restricting tube. In this case, the hose coupling, for example, forms two bulges. However, with rising pressure, a transition to a single bulge is also possible.

It is also particularly advantageous if the diaphragm opening extends over approximately two thirds of the tube periphery and optionally is centrally divided by a longitudinally directed rod, ledge or the like. In this case, once again two bulges are formed and their positions are fixed.

It is also possible to stabilize the bulge shape in that the hose coupling has a reinforcement in the vicinity of the centre of the diaphragm opening.

It is also possible for the diaphragm opening to extend over approximately three quarters of the tube periphery and, optionally for it to be uniformly subdivided by two longitudinal rods. In this case three bulges would be formed, whose positions would be fixed.

The invention also proposes that the diaphragm opening be approximately tear-shaped.

It is particularly advantageous if the restricting tube can be easily replaced. In this case, if different outflow characteristics are desired, one restricting tube can be replaced by another, which for example has different geometrical dimensions of the diaphragm openings. For example, different characteristics can easily be obtained by lengthening the effective hose coupling.

The invention also proposes that a pressure gauge be connected or connectable to the gap between the restricting tube and the filling tube. The device proposed by the invention makes it possible to establish whether the device is operating correctly by merely reading off the pressure gauge.

To make it possible to make the air-filled dead volume in the gap between the restricting tube and the filling tube variable, particularly in order to be able to make it as small as required, according to a further development of the invention the gap can be partially filled with a liquid, preferably water. For this purpose, it is possible to provide both a water inlet and a discharge valve for the gap.

It is particularly advantageous if the hose diaphragm is pretensioned in the radial direction which can e.g. be achieved by using a hose having an internal diameter, which is roughly 10% smaller than the external diameter of the restricting tube causing the hose to deform inwardly.

BRIEF DESCRIPTION OF THE DRAWINGS

Further features, details and advantages of the invention can be gathered from the following description of preferred embodiments and the drawings, wherein.

DETAILED DESCRIPTION OF THE PREFERRED EMBODIMENTS

Figure 1:
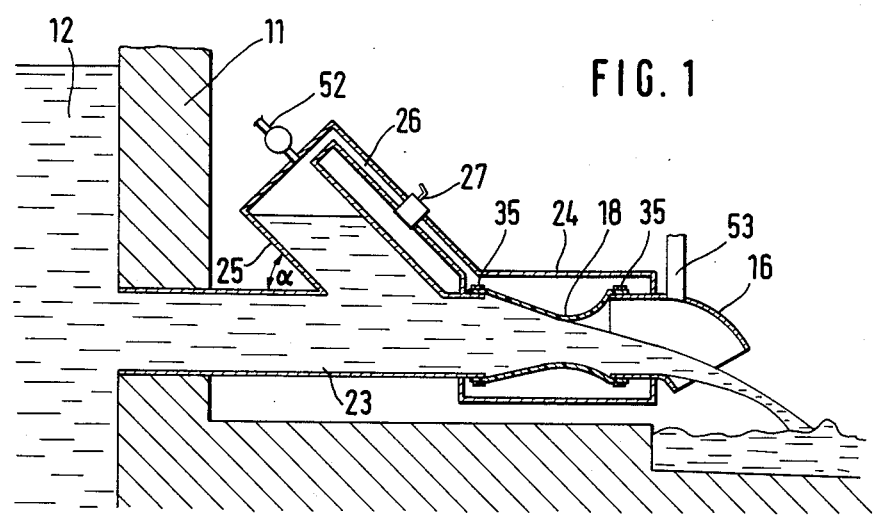
FIG. 1 is a diagrammatic longitudinal section through a first embodiment.

FIG. 1 shows a section through a container wall 11, along side which to the left is arranged a container with water 12. A feed pipe 23, whose right-hand end issues into the encasing tube 24 of the regulator, passes through container wall 11. On the opposite side, encasing tube 24 has an outflow connection 16, out of which the water flows. The right-hand end of a circular cylindrical hose coupling 18 is sealingly fixed to the inner end of the outflow connection 16.

The feed tube 23 in encasing tube 24 has a branch 25, which is directed opposite to the flow direction, the flow being from left to right in FIG. 1. The upper part of branch 25 is connected to a line 26, which issues into the top of encasing tube 24. Line 26 has a slide valve 27. Feed tube 23 projects somewhat into encasing tube 24, so that the left-hand end of a flexible hose coupling 18 can be fitted to the circumferential edge of the front end of pipe 23. The right-hand end of hose coupling 18 is fitted to the inside of outflow pipe 16. In the embodiment of FIG. 1, the liquid rising in branch 25 compresses the gas present in line 26 and the gap between hose coupling 18 and encasing tube 24 and consequently exerts a pressure on the outside of hose coupling 18. Due to the liquid flow through hose coupling 18, there is a pressure difference leading to an inward bulging of hose coupling 18 and consequently to a reduction in the cross-section. It is known that the static pressure of a fluid flowing through such a coupling will decrease with increasing velocity of flow asccording to Bernoulli's Equation. In a flexible coupling the decrease in static pressure causes a constriction of the coupling. FIG. 1 shows that branch 25 forms an angle α, differing from zero, with the longitudinal axis of feed tube 23. Branch 25 can also form an angle differing from zero with respect to the longitudinal axis of feed tube 23 when considered from above or from the front, although this is not apparent in the drawing. These measures make it possible with a minimum height of rise of the liquid in branch 25 to achieve a maximum volume change.

Figure 2:
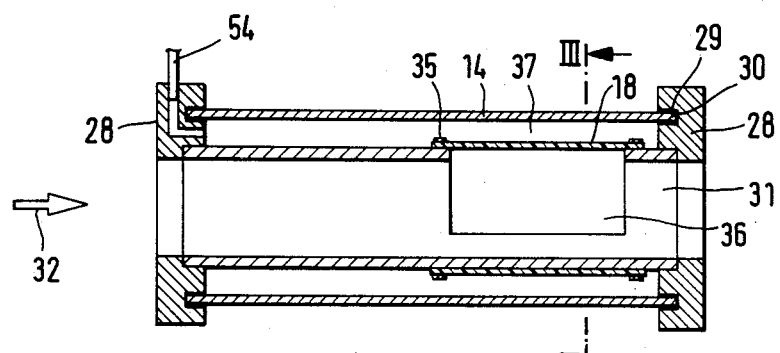
FIG. 2 is a longitudinal section through a second embodiment.

FIG. 2 shows a longitudinal section through an encasing tube 14 of a further embodiment. Encasing tube 14 is placed between two terminal flanges 28, whereby with the aid of gaskets and screw couplings (not shown) it is ensured that the complete unit is tightly sealed. The edges 29 of encasing tube 14 engage in slots 30 on the inside of flanges 28. Within encasing tube 14, a sealed inner restricting tube 31 is placed between the two flanges 28.

Figures 6, 7:
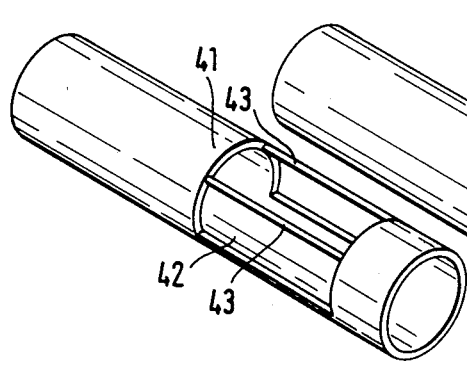

The arrow 32 in FIG. 6 shows the liquid flow direction. An opening 36 is made in the casing of restricting tube 31, which extends over a somewhat larger part of the periphery of the restricting tube cross-section. Hose coupling 18 is mounted on restricting tube 31 in this area and is also fixed to either side of diaphragm opening 36 by means of hose clips 35. The action of the embodiment of FIG. 2 is the same as that of the previous embodiment. When liquid flows in in the direction of arrow 32, it passes into branch 25, so that a pressure is exerted on the outside of hose coupling 18. The remainder of the liquid flows through restricting tube 31 under hose coupling 18. Due to the liquid flow within restricting tube 31, a pressure difference occurs, so that the hose coupling bulges inwards in the vicinity of diaphragm opening 36. The extent of this bulge is dependent on the pressure difference. When the pressure is reduced to the left of the device, the hose coupling 18 bulges back again.

Figure 3:
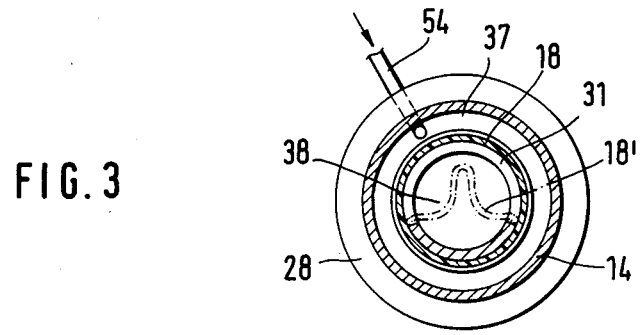
FIG. 3 is a cross-section through the arrangement of FIG. 2.

FIG. 3 shows a section approximately along line III—III of FIG. 2, in which case hose coupling 18 is shown by a broken line in a position 18', which it assumes when a high pressure acts thereon. It is clear that two inwardly directed bulges 38 are formed symmetrically to an axis or center line, while in the lower area where tube 31 has no opening, hose coupling 18 engages on the outside. It is also possible to see a feed pipe 54, through which compressed air can be introduced into gap 37.

Figure 4:
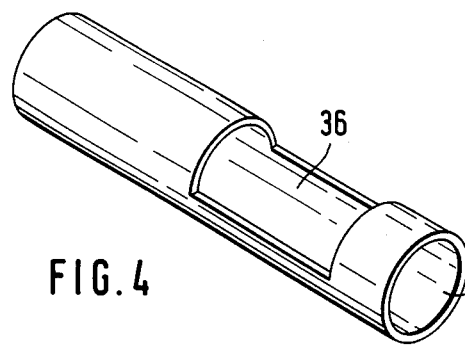
FIGS. 4 to 8 are views of several restricting tubes.

FIG. 4 shows in a perspective view a restricting tube 31, as used in the arrangement of FIG. 2. It can be seen that the diaphragm opening 36 extends over the upper half of restricting tube 31.

Figure 5:
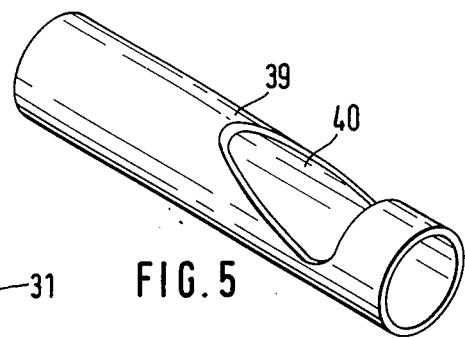

In the case of the restricting tube 39 of FIG. 5, the diaphragm opening 40 widens in the flow direction and the opening is approximately tear-shaped.

In the case of the restricting tube 41 of FIG. 6, the diaphragm opening 42 extends over roughly three quarters of the periphery of the cross-section and is uniformly subdivided by two longitudinal rods 43. Thus, three inwardly directed bulges 38 are formed in the case of this tube 41.

In the case of the restricting tube 44 shown in FIG. 7, there are two diaphragm openings 45, which both have a rough tear shape and are separated from one another by a narrow web 46. In operation, two inwardly directed bulges 38 are formed in the case of this tube.

Figure 9:
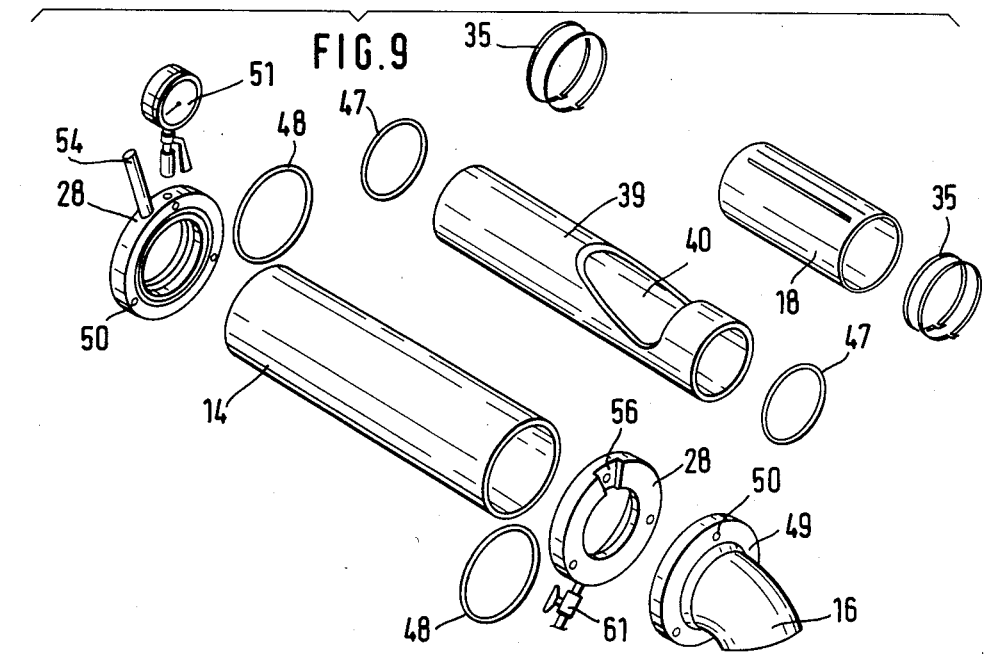
FIG. 9 is a perspective view of the individual parts of a regulator according to the invention.

FIG. 9 again shows the components from which the device proposed by the invention is constructed. The device essentially contains the two flanges 28, between which can be inserted the inner restricting tube 39 with the aid of two gaskets 47. Hose coupling 18 is mounted on restricting tube 39 in such a way that it comes to rest over the diaphragm opening 40.

The hose is fixed with the aid of hose clips 35. As the outer wall, encasing tube 14 is then inserted between flanges 28, with the aid of two gaskets 48, and flange 49 carrying outlet 16 is attached from the right. The complete unit is then screwed down with the aid of threaded pins (not shown), which pass through three holes 50 in flanges 28 and 49.

For the better optical supervision or inspection of the device, encasing tube 14 can be made from a transparent material. To the left in FIG. 9 it is possible to see a pressure gauge 51, which can for example be fixed to flange 28 and is connected to the gap 37 between restricting tube 39 and encasing tube 14. The correct operation of the device can be monitored with the aid of pressure gauge 51.

Compressed air is supplied to gap 37 by means of a feed pipe 54, which is connected to the outlet of valve 27 in FIG. 1. A slot 56 is provided on the top of terminal flange 28 for venting the outflowing water jet. The gap 37 between encasing tube 14 and restricting tube 39 is preferably 50% to 75% filled with water or some other liquid. This liquid can be drained off via valve 61.

In order to produce different characteristics with an existing regulator, it is merely necessary to remove the restricting tube and replace it by another restricting tube, in which e.g. the diaphragm opening has a different shape or size. Replacement can take place with the container full because normally a shutoff valve is provided on the feed side of such a device. The device proposed by the invention additionally has the important advantage that it permits the passage of large objects, which even applies in the case of an object larger than the smallest liquid cross-section within hose coupling 18, whereby the device is in no way damaged. If the object sticks at the narrowest point, there is a reduction to the flow rate and correspondingly to the pressure difference, so that there is automatically a bulging back of hose coupling 18. The resulting liquid surge then leads to the further conveying of the object. In this case, hose coupling 18 performs peristaltic movements.

Figure 8:
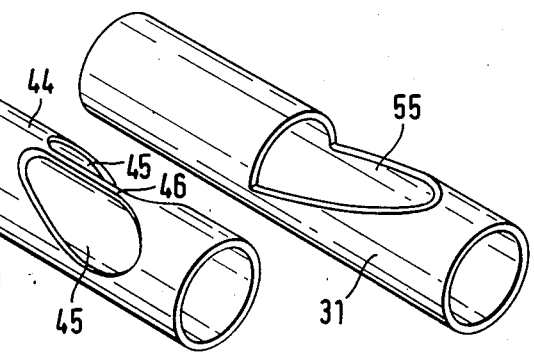

FIG. 8 shows a restricting tube 31, which enables a surprisingly good action. In the case of this embodiment, the start of the diaphragm opening 55 passes over approximately half of the upper periphery, while the width gradually decreases in the flow direction, so that there is a constant decrease of the surface of the opening in the flow direction. Thus, diaphragm opening 55 has roughly the reverse construction to diaphragm opening 40 of the embodiment of FIG. 5. It is possible to initially bring about a constant increase in the diaphragm opening width, which then constantly decreases. For example, the diaphragm opening can have the shape which would occur in FIG. 7 if the longitudinal web 46 was removed.

What is claimed:

1. A device for automatically regulating liquid flow in pipelines and the like, with a flexible hose coupling forming at least part of a liquid flow path between an inlet and an outlet of the device, comprising:
    an encasing in which the hose coupling is so disposed as to form a sealed gap there between, the hose coupling being radially pretensioned;
    a branch flow path from the inlet directed upwardly and oppositely in direction relative to the liquid flow path, having a closed upper end; and,
    a gas-tight line communicating between the upper end of the branch flow path and the gap between the encasing tube and the hose coupling, thereby indirectly subjecting the outside of the hose coupling to the pressure of the liquid flowing therethrough, whereby the flexible hose coupling becomes more and less constricted in response to variations in the liquid flowing through the device.

2. A device according to claim 1, wherein the branch flow path has an effective cross-section larger than the effective cross-section of the inlet.

3. A device according to claim 1, wherein the encasing tube and the flexible hose coupling define a substantially horizontal longitudinal axis and the branch flow path defines an angle larger than zero relative to the longitudinal axis, at least when viewed in side elevation.

4. A device according to claim 3, wherein the branch flow path is inclined with respect to horizontal, when viewed in front elevation.

5. A device according to claim 1, wherein at least part of the periphery of the hose coupling is unbendably secured over its entire length.

6. A device according to claim 1, further comprising a restricting tube connecting the inlet and outlet of the encasing tube, the restricting tube having at least one diaphragm opening therein.

7. A device according to claim 6, wherein the hose coupling is mounted over the diaphragm opening of the restricting tube.

8. A device according to claim 6, wherein the width of the diaphragm opening in the restricting tube increases in the flow direction.

9. A device according to claim 6, wherein the diaphragm opening extends over approximately one-half the perimeter of the restricting tube.

10. A device according to claim 6, wherein the diaphragm opening extends over approximately two-thirds of the perimeter of the restricting tube, and the restricting tube comprises a longitudinally directed web through the opening.

11. A device according to claim 6, wherein the diaphragm opening extends over approximately three-quarters of the perimeter of the restricting tube, and the restricting tube comprises two longitudinally directed webs through the opening.

12. A device according to claim 6, wherein the diaphragm opening is approximately tear-shaped.

13. A device according to claim 6, adapted for use with any one of a plurality of interchangeable restricting tubes, each of the restricting tubes having diaphragm openings of varied size and shape relative to one another.

14. A device according to claim 6, wherein the width of the diaphragm opening in the restricting tube decreases in the flow direction.

15. A device according to claim 1, further comprising a pressure gauge operatively connected to the gap between the hose coupling and the encasing tube.

16. A device according to claim 1, wherein the flexible hose coupling incorporates a longitudinally directed, flexible but relatively inextensible band.

17. A device according to claim 1, further comprising a venting device for the gap between the hose coupling and the encasing tube.

18. A device according to claim 1, further comprising a vent for the outlet.

19. A device according to claim 1, further comprising a terminal disk 28 for sealably connecting the outlet ends of the restricting tube and encasing tube, the disk having a radially directed venting slot therein for the outlet.

20. A device according to claim 1, wherein the hose coupling comprises at least one longitudinally directed reinforcement means.

21. A device according to claim 1, further comprising a charge of liquid at least partly filling the gap between the hose coupling and the encasing tube.

22. A device according to claim 21, further comprising a valve for emptying liquid from the gap.

* * * * *